G. A. SHEPARD.
MACHINE FOR COVERING REEDS FOR HAT-TRIMMINGS.
No. 6,782. Reissued Dec. 7, 1875.
Fig. 1
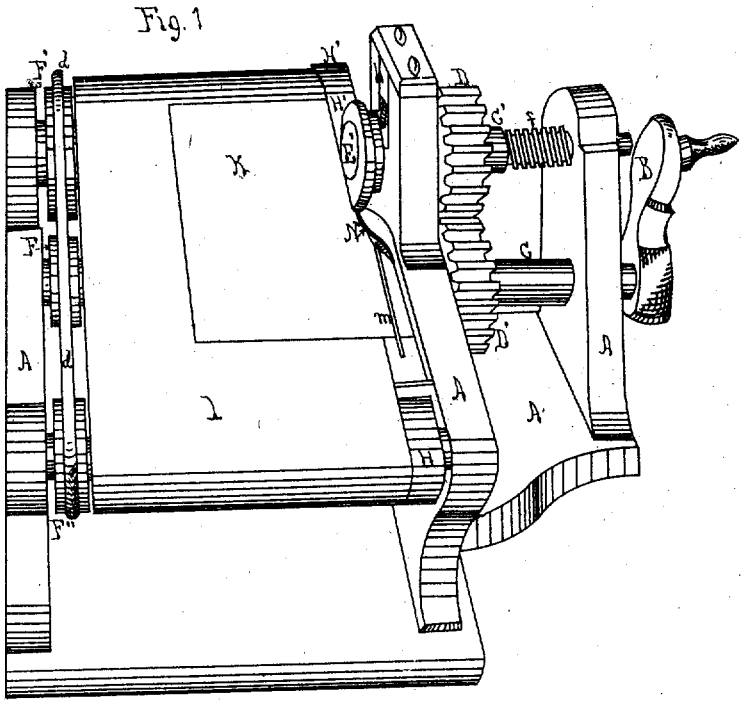
Fig. 2
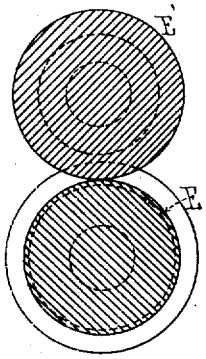
Fig. 3
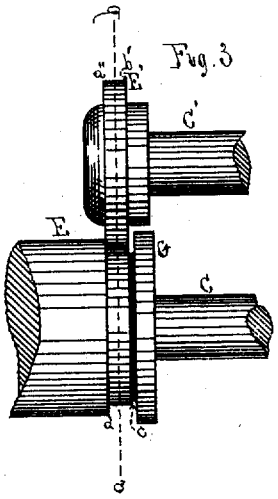
Fig. 4
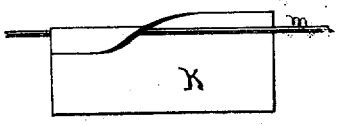
Fig. 5
Fig. 6
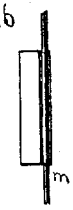
Witnesses.
G. E. Pratt
George S. Tubman
Inventor
George A. Shepard,
By Rice & Pratt,
Attys
N. PETERS, PHOTO-LITHOGRAPHER, WASHINGTON, D. C.

UNITED STATES PATENT OFFICE.

GEORGE A. SHEPARD, OF BETHEL, CONNECTICUT, ASSIGNOR TO JOSEPH H. DAVIS, OF BOSTON, MASSACHUSETTS.

IMPROVEMENT IN MACHINES FOR COVERING REEDS FOR HAT-TRIMMINGS.

Specification forming part of Letters Patent No. 102,722, dated May 3, 1870; reissue No. 6,782, dated December 7, 1875; application filed February 8, 1875.

*To all whom it may concern:*

Be it known that I, GEORGE A. SHEPARD, of Bethel, Connecticut, have invented Improvements in Machines for Covering Reeds for Hat-Trimmings, of which the following is a specification:

The object of this invention is to cover rods of whalebone, wire, or other material, technically known as reeds, used in trimming hats with prepared cloth, leather, or other material, or attaching the same by machinery, at a single operation.

The invention consists, first, in the combination of a folding-gage, a lower revolving presser or roller, and an upper revolving presser or roller, formed on the projecting end of a revolving shaft, so as to enable the material to be folded to be introduced from one side between the revolving pressers without regard to its width or length, and so as to permit the easy inspection and regulation of the operation of the revolving pressers when at work; second, in the combination of a folding-gage with a revolving presser formed on the projecting end of a revolving shaft, rotating against a second revolving presser, formed with a flange or guide revolving with it behind the pressing-surfaces, to regulate the width of the material to be passed between the surfaces, and prevent its escaping through beyond them; third, in the combination of an endless feed-apron, a folding-gage, and revolving pressers formed with cutting-edges, as hereinafter described; fourth, in the combination of a folding-gage with a revolving presser formed on the projecting end of a revolving shaft, and a second revolving presser, having a groove in its pressing-surface, to admit of the passage of the reed over which the covering material is folded, the object of this part of the invention being to give the proper pressure upon the cemented material folded around the reed, without pressing or crushing the latter out of shape or position; fifth, the combination of a revolving presser, formed on the projecting end of a revolving shaft, having a cutting-edge at the outer end of its pressing-surface, with a second revolving presser, having a raised cutting edge or flange on the outer end of its pressing-surface, so that the two cutting-edges correspond, and may be brought into constant contact, and a spiral spring on the upper revolving shaft, by which the cutting-edges may be firmly pressed together, so as to operate at the point of contact like revolving shears.

In the drawing, Figure 1 is a perspective view of a machine embodying my invention. Fig. 2 is a section of the upper revolving disk and lower roller, upon which are formed the pressers or pressing-surfaces *a b*. Fig. 3 is a side view of the same, showing the pressing-surfaces, the groove for the reed, and the guide-flange attached to the lower presser in rear of the pressing-surfaces, for regulating the width of the material which is passed through between them and its compression around the reed and the cutting-edges, in contact on the side of the pressing-surfaces opposite the groove and guide-flange. Fig. 4 shows a piece of the covering material, partly turned over and upon the reed, as is done by passing it through the curling-gage set in front of the revolving pressers. Fig. 5 is a cross-section of the covered reed as it appears after passing through the machine. Fig 6 is a side view of the same.

A is the frame of the machine. B is a crank, by which the shaft C is made to turn. C′ is a shaft over the shaft C, and is made to turn by the motion of the shaft C through the gears D D′. E and E′ are the revolving disk and roller, formed or placed on and concentric with the revolving shafts C and C′, and constructed so that their pressing-surfaces *a* and *b* revolve with equal velocity, and are turned in opposite directions by the shafts C C′. The roller E has a flange, *o*, on the outer side of its pressing-surface, on the upper and inward circumference of which is a cutting-edge, *a′*, and on the outer circumference of the disk E′ is also a cutting-edge, *a″*, both the end of the disk E′ and the flange *o* being turned a little under. F is a pulley on the outer end of the shaft C, and when in motion gives a corresponding motion to the pulleys F′ F″ and to the rollers H H′, to which the pulleys F′ F″ are fastened by means of the belt *d*. I is an endless apron strained over the rollers H H′, and moving with them. K is a piece of material covered on its upper side with adhesive substance, so that when folded over and pressed together it will firmly adhere. *m* is a reed, such as may be used in hat-trimming, laid at the proper distance from the edge of the material, which is to be folded over it and pressed down. N is a folding or curling gage, made of such shape and form that when the material K and reed *m* are passed through it the material will be folded over the reed to the proper distance, and it is so placed with reference to the revolving pressers that the material so folded over the reed shall pass directly between the pressers, the reed and material directly about it following in the groove C and against the guide G. The flange or guide G is formed on the lower revolving roller E, and projects past the place of contact of the pressing-surfaces *a* and *b*, in whatever position they may be, and acts as a gage to regulate the width of material which may be introduced between the pressers from the other side, and prevents its escaping from between the presser-surfaces. The groove *c* is formed in one side of the roller E, next to the gage G, and the corresponding edge of the disk E′ is turned off somewhat, so that the material may be firmly pressed around the reed as it passes through or over the groove without crushing the reed or injuring the material. *h* is a spring, by which the disk E′ is made to press firmly though not rigidly against the pressing-surface *a*, to cause the adhesive material to adhere as it passes between the surfaces. *f* is a spring on the shaft C′, by which the cutting-edge *a*″ of the disk E′ may be kept firmly against the cutting-edge *a*′ of the flange *o*, thus forming rotary shears to cut off the material at the line of contact as it passes through; and this action of the spring *f* in the direction of the axes of the shafts is necessary to the complete action of the cutting-edges, for if it does not operate the material will pass by between the pressers without being cut.

When the machine is in operation for covering reeds, a strip of prepared material is placed on the endless apron, with the reed at the proper distance from the inner edge, and both the material and the reed are carried by the apron through the folding-gage and between the pressing-surfaces, so that the reed follows through the groove and against the gage, and the turned edge of the material is pressed closely down by the pressing-surfaces, and adheres firmly, and at the same time the strip of material containing the reed so covered is cut off at the proper width, and the covered reed is turned out ready for use.

It will be seen that when the material is introduced in front of the pressing-surfaces *a b*, the guide-flange G operates not only to prevent the material from escaping in the rear of the pressers, but also as a gage to regulate the width of the material pressed and of the strip cut off, and, in conjunction with the groove *c* and turned-off edge *b*′ of the disk E′, to compress the material neatly about the reed and make an even finish. It will also be seen that the operation may be repeated as often as desired by bringing the material again along on the apron and passing it through the folding-gage and other parts in the same manner; and the construction of the disk E′ upon the end of the shaft, with its pressing-surface revolving upon the pressing-surface of the roller below, is such that the material can be conveniently manipulated about it, and easily inspected and adjusted during the operation, and the work is done without compressing or injuring the material beyond the line of contact of the cutting-edges.

The sheet of adhesive material passing over the horizontal apron of the machine as the folding and pressing of its edge proceeds, and being attached to its edge, which is folded and pressed substantially until the instant it passes between the pressing-surfaces, serves to regulate the operation of the folding device, and the width of folded material passing between the pressing-surfaces to be pressed with the utmost nicety, and enables the operator to leave a greater or less selvage edge of one thickness of material upon the side of the covered reed by causing the folding-gage to turn over the edge of the material to a greater or less width upon its surface; and this action of the sheet of adhesive material upon its edge to be folded over, and the operation of folding and pressing it with accuracy, are only rendered possible by the pressing-surface of the disk E′ being formed upon the projecting end of its shaft outside of the shaft-bearings, so as to permit the sheet of adhesive material to be introduced from the open side of the pressing-surfaces and remain attached to its edge, which is folded over substantially until the fold passes between the pressing-surfaces, while the sheet of adhesive material continues to progress in the same plane as before, past the end of the disk E′, under the control of the operator, and without itself passing between pressing-surfaces.

What I claim as new and my invention is—

1. The combination of the folding-gage N, placed in front of the pressing-surfaces *a b*, with the pressing-surface *b* of the revolving disk E′, constructed upon the projecting end of the shaft C′, and the pressing-surface *a* of the roller E, substantially as described.

2. The combination of the pressing-surface *b* of the disk E′, constructed upon the projecting end of the shaft C′, with the pressing-surface *a* of the roller E, the gage G behind the pressing-surfaces, and the folding-gage N, placed in front of the pressing-surfaces *a b*, to fold the material before it passes through between them, substantially as described.

3. The endless apron I, in combination with the folding-gage N, and the disk E′ and roller E, having the flange *o* and the cutting-edges *a′* and *a″*, substantially as described.

4. The combination of the pressing-surface *b*, with the disk E′, and the pressing-surface *a* of the roller E, with the groove C, and the folding-gage M, substantially as described.

5. The spring *f*, in combination with the cutting-edges *a′* and *a″* of the disk E′ and roller E, and the folding-gage N, substantially as described.

GEORGE A. SHEPARD.

Witnesses:
WILLIE P. BAILEY,
AMOS WOODMAN.